Dec. 1, 1964
A. R. DAVIS
3,159,436
INTERLOCKING CASING
Filed May 22, 1962
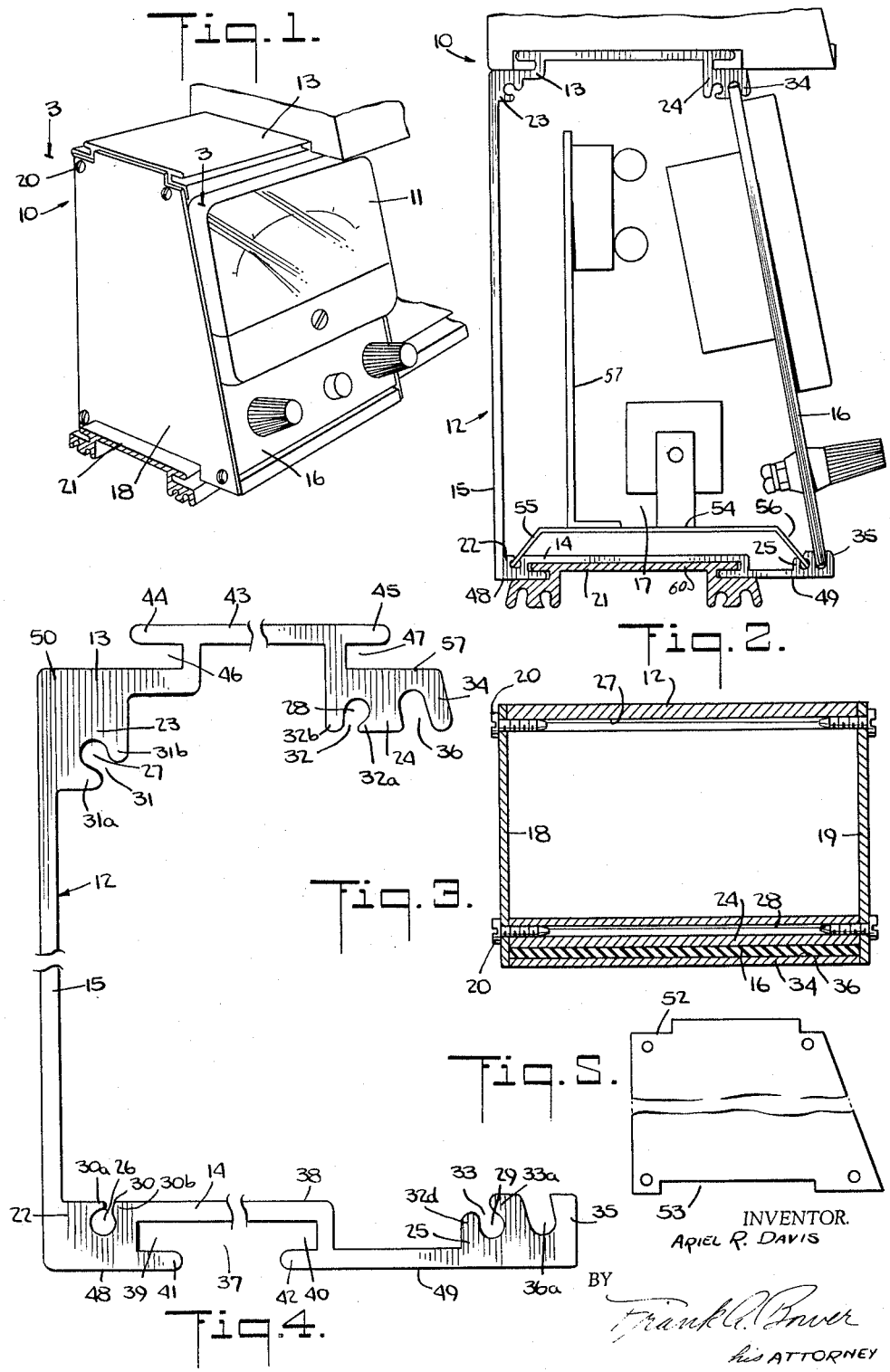
INVENTOR.
ARIEL R. DAVIS
BY Frank A. Bower
his ATTORNEY

3,159,436
INTERLOCKING CASING
Ariel R. Davis, 3187 S. State, Salt Lake City 15, Utah
Filed May 22, 1962, Ser. No. 196,825
2 Claims. (Cl. 312—107)

This invention relates to casings for housing electrical components.

An object of this invention is to provide an inexpensive casing for electrical components that is easily assembled and may be stacked in interlocking relation with other similar type casings.

Other and further objects and advantages will be apparent from the following description taken in connection with the drawings, in which FIG. 1 is a perspective view of the casing housing with an electric meter;

FIG. 2 is an end view of the casing with a side plate removed;

FIG. 3 is a sectional view of the casing taken along lines 3—3 of FIG. 1;

FIG. 4 is an enlarged fragmentary end view of the supporting member; and

FIG. 5 is a fragmentary side view of the side plates.

Referring to the drawings, the casing 10 supports and houses an electric meter 11. The casing may be used to house other electric components, such as transformers, resistances, inductances, and the like. The casing 10 comprises a U-shaped supporting member having top, bottom and rear panels 13, 14, 15. A front panel 16 fits between the top and bottom panels to form a chamber 17 for the electrical components. The sides of the chamber are closed by the side plates 18, 19 fastened to the supporting member by bolts 20. The casing may be supported or mounted on a table or workbench by the bracket 21.

The top and bottom panels 13, 14 extend parallel to one another and normal to the connecting rear panel 15. Along the edges of the top and bottom panels are longitudinal bosses 22, 23, 24, 25 with the boss 23 in the corner between the top panel and the rear panel and the boss 22 between the bottom panel and the rear panel. The bosses extend into the chamber and have cylindrical grooves 26, 27, 28, 29 extending longitudinally and have longitudinally extending slots 30, 31, 32, 33 opening the grooves along one side into the chamber 17. The bolts or screws 20 securing the side plates to the supporting member are threaded into a respective groove. The slots 30, 31, 32, 33 are at an angle to the vertical with lips 30a, 31a, 32a, 33a extending over or beneath the groove. The opposing lips 30b, 31b, 32b, 33b terminate to present the slots as extending toward the center of the chamber 17.

A platform or pedestal 54 has sloped edge or angled end portions 55, 56 fitting in the lower grooves 26 and 29 for supporting electrical components, as illustrated in FIG. 2. The slots 30 and 33 receive the end portions 55 and 56 with the end portions being retained by the lips 30a and 33a. The pedestal is slid endwise into the grooves 26, 29 and held in place by screws 20. The pedestal may have a post 57 extending upwardly through the chamber 17 for supporting electrical components.

Along the front edges of the top and bottom panels are flanges 34 and 35 forming longitudinally extending grooves 36, 36a with the bosses 24 and 25. The front panel is slid sideways into these grooves for retention in the supporting member. The side plates 18 and 19 hold the front panel in the supporting member by overlapping with the edges of the front panel.

The bottom panel has a longitudinal T-shaped slot 37 bridged by the U-shaped boss 38 forming grooves 39, 40 with the projections 41, 42. In the top panel the generally T-shaped member 43 extends above the casing and has edge projections 44, 45 forming grooves 46, 47 on opposite sides thereof. The T-shaped member 43 extends longitudinally across the top of the supporting member and is complementary to the T-shaped slot 37 extending longitudinally across the bottom panel. The top panel of one casing thus may be interlocked with the bottom panel of another casing for the vertical stacking of the units, as illustrated in FIGS. 1 and 2.

The surfaces 48 and 49 on the bottom panel rest on the surfaces 50 and 51 of the top panel. The bottom panel is wider than the top panel to position the front edge of the bottom panel further forward than the front edge of the top panel, imparting a slope to the front panel. Thus in a stacked relation the bottom of the upper casing projects over the front of the lower casing.

The dials, connections, wiring diagrams and the like are on the front panel. The side plates have the same general shape as the cross section of the supporting member. Notches 52 at the top end accommodate the plate to the grooves 46, 47 and a notch 53 along the lower edge forms an opening for the T-shaped slot 37.

The bracket 21 has a T-shaped member 60 similar to the T-shaped member 43 of the top panel. The bracket 21 may be secured to a desk, table or workbench for supporting casing 10. A number of casings may be placed in this side by side relation.

The supporting member 12 is severed from a long extruded piece of anodized aluminum. The length of the casing can thus be varied to accommodate different types and amount of equipment. The bosses and grooves and slots and flanges are formed on extrusion so that the supporting member is a single piece of metal. The front panel is preferably made of insulating material and supports connections and components, as illustrated in FIGS. 1 and 2. The electrical components are mounted on the panel and the pedestal and these elements are then slid sideways into the respective grooves.

Thus basic electrical circuits and equipment may be housed in the casing 10 and mounted in interlocking relation onto the worktable, and various basic circuits may be quickly connected together, such as rectifiers, variable voltage devices and the like. Also, the components may be readily connected into new or seldom used types of networks. This is of great advantage as an educational equipment. The meters and other components are securely attached to the worktable so as to remove the danger of their being damaged by inadvertently being dropped to the floor.

Further, the vertical stacking of the components saves space on the worktable and presents the units in a panel form to the student or worker.

Further, the components may have built in circuit protection means so that the sensitive devices may be protected against damage by incorrect connections.

Various modifications may be made to the casing without departing from the invention as set forth in the appended claims.

I claim:

1. A casing comprising a supporting member having a rear panel, top panel and bottom panel and formed in a generally U shape by the top and bottom panels extending from the connecting rear panel, a front panel forming a chamber with said supporting member, two side plates with fastening means, said supporting member having bosses extending along the front and back edges of said top and bottom panels and having longitudinal flanges extending on the outer edges of said top and bottom panels, said bosses having grooves longitudinally extending the length of the panels and opening generally toward the center of said chamber for receiving angled portions of a component supporting pedestal, and said flanges spaced from said front bosses to form slots, said front panel fitting in said slots and said fastening means extending longitudinally into said grooves to secure said side plates to said supporting member to enclose said chamber with said front panel.

2. A casing as set forth in claim 1 wherein said top panel has a longitudinal T-shaped member and said bottom panel has a longitudinal T-shaped slot complementary to said T-shaped member for interlocking of casings in stacked relation.

References Cited in the file of this patent

UNITED STATES PATENTS

| | | |
|---|---|---|
| 1,956,389 | Kintz | Apr. 24, 1934 |
| 2,491,873 | Nicole | Dec. 20, 1949 |
| 2,552,372 | Geyh | May 8, 1951 |
| 2,567,829 | Suthann | Sept. 11, 1951 |
| 2,723,484 | Nelson | Nov. 15, 1955 |
| 2,739,022 | Hinz | Mar. 20, 1956 |

FOREIGN PATENTS

| | | |
|---|---|---|
| 417,919 | Italy | Feb. 1, 1947 |
| 498,113 | Canada | Dec. 1, 1953 |
| 547,130 | Belgium | May 15, 1956 |
| 634,373 | Great Britain | Mar. 22, 1950 |
| 1,007,130 | France | Feb. 6, 1952 |